United States Patent
Bolzmann et al.

(10) Patent No.: US 7,624,636 B2
(45) Date of Patent: Dec. 1, 2009

(54) METHOD AND SYSTEM FOR OPERATING A SENSOR

(75) Inventors: Oliver Bolzmann, Hannover (DE); Klaus Küster, Hannover (DE)

(73) Assignee: WABCO GmbH, Hannover (DE)

( * ) Notice: Subject to any disclaimer, the term of this patent is extended or adjusted under 35 U.S.C. 154(b) by 162 days.

(21) Appl. No.: 11/547,946

(22) PCT Filed: Jan. 26, 2005

(86) PCT No.: PCT/EP2005/000727

§ 371 (c)(1), (2), (4) Date: Aug. 21, 2007

(87) PCT Pub. No.: WO2005/108925

PCT Pub. Date: Nov. 17, 2005

(65) Prior Publication Data

US 2007/0289381 A1 Dec. 20, 2007

(30) Foreign Application Priority Data

Apr. 16, 2004 (DE) .................. 10 2004 018 623

(51) Int. Cl.
*G01P 3/00* (2006.01)
*G01M 17/00* (2006.01)
*G06F 5/00* (2006.01)

(52) U.S. Cl. ..................... 73/509; 701/34; 702/104

(58) Field of Classification Search .......... 73/1.37, 73/1.38, 504.04, 504.12, 510, 511, 509; 702/103, 702/104, 105; 701/34

See application file for complete search history.

(56) References Cited

U.S. PATENT DOCUMENTS

| | | | |
|---|---|---|---|
| 5,578,754 A | | 11/1996 | Kato et al. |
| 5,633,461 A | * | 5/1997 | Kakizaki et al. .............. 73/493 |
| 5,942,685 A | * | 8/1999 | Tabota .......................... 73/493 |
| 5,973,081 A | | 10/1999 | Kanai et al. |
| 6,094,984 A | * | 8/2000 | Asano et al. ................... 73/493 |
| 6,112,594 A | * | 9/2000 | Brinks et al. .................. 73/493 |
| 6,298,709 B1 | | 10/2001 | Artzner et al. |
| 6,496,759 B1 | | 12/2002 | Mattes et al. |
| 6,498,996 B1 | | 12/2002 | Vallot |
| 6,594,563 B1 | * | 7/2003 | Ding .............................. 701/34 |
| 6,778,400 B2 | | 8/2004 | Kurle et al. |
| 6,796,180 B2 | | 9/2004 | Katsumata |
| 7,031,852 B2 | * | 4/2006 | Kato ............................. 702/56 |
| 2004/0204872 A1 | | 10/2004 | Kato |

FOREIGN PATENT DOCUMENTS

DE 44 44 973 C2 6/1995

(Continued)

*Primary Examiner*—Helen C. Kwok
(74) *Attorney, Agent, or Firm*—Kramer Levin Naftalis & Frankel LLP

(57) ABSTRACT

A method and system for operating a sensor, particularly, a yaw rate sensor, which is housed inside a housing. In order to detect the potentially dangerous influence of mechanical vibrations upon the output of the sensor, the vibrations are sensed at the location of the sensor, and the sensor or an electronic device interacting with the sensor is switched off for as long as the vibrations exceed an established intensity. The method and system of the present invention can be used in a driving dynamics control system of a road vehicle, for example.

18 Claims, 1 Drawing Sheet

FOREIGN PATENT DOCUMENTS

| | | |
|---|---|---|
| DE | 197 39 903 A1 | 4/1999 |
| DE | 198 28 338 A1 | 12/1999 |
| DE | 100 22 968 A1 | 11/2001 |
| DE | 102 15 853 A1 | 10/2002 |
| DE | 101 28 056 C1 | 11/2002 |
| DE | 199 36 434 A1 | 1/2003 |
| DE | 10 2004 014 914 A1 | 10/2004 |
| JP | 03159877 A | 11/1989 |
| JP | 11-064376 * | 3/1999 |
| JP | 2001 06 5403 A | 8/1999 |
| WO | WO 03/067190 A1 | 8/2003 |

\* cited by examiner

METHOD AND SYSTEM FOR OPERATING A SENSOR

BACKGROUND OF THE INVENTION

The present invention relates to a new method and system for operating a sensor.

Sensors, especially rate-of-rotation, or yaw rate, sensors, can be expediently installed in a housing together with an associated evaluating electronic unit. For this purpose, the sensors can be mounted together with other electronics on the same printed circuit board, or can be provided on a separate printed-circuit board. Yaw rate sensors are used, for example, in vehicle systems for electronic stability control (ESC), adaptive cruise control (ACC) and roll stability control (RSC). A yaw rate sensor detects rotation around the vertical axis of the vehicle. For this purpose, an oscillating element such as a tuning fork or oscillating body of some other construction is disposed inside the sensor. The oscillating element is excited to vibration and measures a deflection caused by coriolis force during rotation around a vertical axis. Known yaw rate sensors are described in WO 03/067190 A1, DE 102 15 853 A1, and DE 44 44 973 C2 and are usually manufactured as micromechanical components making them sensitive to shaking and other mechanical vibrations, which can cause false readings and even destruction of the sensors.

False readings are particularly critical with respect to the vehicle system applications noted above because false control signals (which do not correspond to true vehicle behavior) can be generated and endanger the vehicle and its occupants. Furthermore, the control system is not always capable of distinguishing false readings from the actual rate of rotation.

DE 100 22 968 A1 describes a cushioning and damping design for a printed-circuit board on which the sensor is mounted. This design, however, is not ideal because the electronics are considerably more expensive. Furthermore, it is technologically difficult to maintain control over such damping devices because cushioning and damping effects can vary over time.

Test results indicate that vibrations of a certain frequency range, particularly between 300 and 450 Hz, are responsible for impaired output signals of rate-of-rotation sensors. At and above a certain level of vibration, these vibrations may lead to DC offset drift of the output signal.

High-quality yaw rate sensors that are insensitive to vibrations and impacts can be used. However, because of the high price of such sensors, their use as mass-produced components in motor vehicles is impractical.

SUMMARY OF THE INVENTION

Generally speaking, in accordance with the present invention, a new method and system for operating a sensor, particularly, a yaw rate sensor, are provided. To detect the potentially dangerous influence of mechanical vibrations upon the output of the sensor, vibrations are sensed at the location of the sensor, and the sensor, or an electronic device interacting with the sensor, is switched off for as long as the vibrations exceed a predefined intensity.

It is an object of the present invention to avoid defective output signals of yaw rate sensors and prevent harmful effects of such defective signals on electronic stability control or other vehicle systems.

Another object of the present invention involves use of yaw rate sensors in a more cost-effective manner to achieve a reduction in costs associated with ESC systems, even when additional acceleration sensors are utilized.

It is yet another object of the present invention to avoid the need for complex measures to damp vibrations to the printed-circuit board, and to enable utilization of more cost-effective materials, such as, for example, plastic, for the sensor housing.

Still other objects and advantages of the present invention will in part be obvious and will in part be apparent from the specification.

The present invention accordingly comprises the various steps and the relation of one or more of such steps with respect to each of the others, and embodies features of construction, combination of elements, and arrangements of parts which are adapted to effect such steps, all as exemplified in the constructions herein set forth, and the scope of the invention will be indicated in the claims.

BRIEF DESCRIPTION OF THE DRAWINGS

The present invention will be described in more detail hereinafter on the basis of the accompanying drawing, in which.

DETAILED DESCRIPTION OF THE PREFERRED EMBODIMENTS

Figure 1:
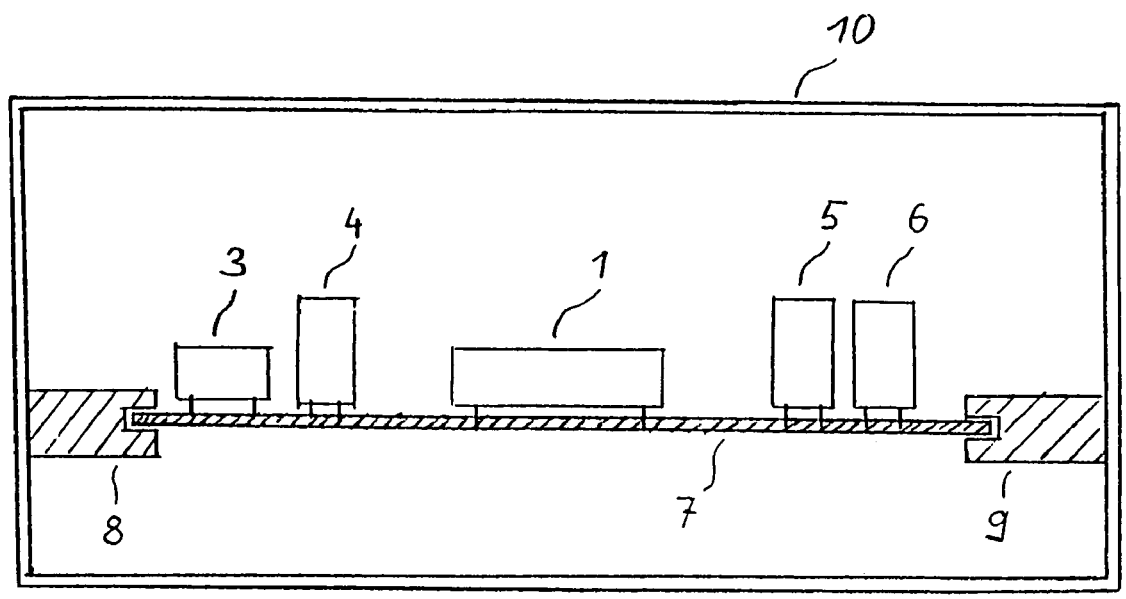
FIG. 1 is a schematic diagram showing an electronic unit installed in a housing and containing a yaw rate sensor in addition to other components for use in accordance with an embodiment of the present invention.

Referring now to FIG. 1, a printed-circuit board (7), to which there are soldered electronic components (1, 3, 4, 5, 6) is shown. Printed-circuit board (7) is fixed inside an electronics housing (10) by means of holding members (8, 9). As an example, electronics housing (10) can contain an electronic stability control (ESC) system and be disposed on board a motor vehicle.

Printed-circuit board (7) further includes an electronic unit (3), which is capable of receiving and evaluating output signals of a sensor (1), among other tasks. Sensor (1) is preferably a yaw rate sensor. It should be understood that electronic unit (3) can further include electronic components of an ESC system that are not shown individually in FIG. 1.

According to a preferred embodiment of the present invention, acceleration sensors (4, 5, 6) are disposed in the immediate proximity of sensor (1). Preferably, acceleration sensors (4, 5, 6) can measure different vibrational bandwidths or frequencies and/or have different measuring directions.

In order to reliably record all vibrations, acceleration sensors (4, 5, 6) are preferably constructed and arranged to take measurements in three different spatial axes.

It should be appreciated that sensor (1) can also be mounted together with acceleration sensors (4, 5, 6) on a "baby" printed-circuit board as a prefabricated, single module (not shown).

According to one embodiment of the present invention, housing (10) and/or printed-circuit board (7) can also be constructed such that they are disposed far from critical mechanical sensor excitations or vibrations. As a result, sensor (1) is advantageously placed at a position located far from maximum vibrational amplitudes. Suitable positions can be determined by testing, for example.

According to another embodiment, holding members (8, 9) for printed-circuit board (7) can also be designed to damp vibrations to further reduce harmful vibrations transmitted to sensor (1).

Housing (10) and/or printed-circuit board (7) can also be mechanically designed such that external vibrational excitation leads to small, narrowly confined resonance ranges. Measures in this regard are known to those skilled in the art. Sensor (1) can then be placed at a position where the resonance range is minimal or non-existent. This can be determined by testing, for example.

The vibrations measured or detected by acceleration sensors (4, 5, 6) are evaluated in electronic unit (3). Should these vibrations exceed a predefined intensity and occur within a certain, predefined critical frequency band, for example from approximately 300 to 450 Hz, electronic unit (3) initiates appropriate actions, including deactivating downstream functions, to ensure that impaired output signals cannot be transmitted further and thus lead to erroneous vehicle reactions.

The present invention provides considerable improvement in safety with respect to ESC or other systems while at the same time reducing costs.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for operating a sensor, said sensor being installed on a printed-circuit board disposed in a housing, the method comprising the steps of measuring mechanical vibration at a location of said sensor, and deactivating at least one of said sensor and an electronic unit coupled to said sensor for as long as said vibration is at least one of exceeding a predefined intensity and occurring within a predefined frequency band.

2. The method according to claim 1, wherein said step of measuring said mechanical vibration is effected by means of at least one acceleration sensor.

3. The method according to claim 2, wherein said at least one acceleration sensor is disposed immediately proximate to said sensor.

4. The method according to claim 2, wherein said at least one acceleration sensor is constructed and arranged to measure different vibrational bandwidths.

5. The method according to claim 4, wherein said at least one acceleration sensor has a bandwidth between 300 and 450 Hz.

6. The method according to claim 1, wherein at least one of said housing and said printed-circuit board is constructed to form only a minimal number of narrowly confined resonance ranges during vibrational excitation.

7. The method according to claim 1, further comprising the step of mounting said printed-circuit board in a vibration-damping manner in holding members.

8. The method according to claim 1, wherein said sensor is a yaw rate sensor.

9. The method according to claim 2, wherein said at least one acceleration sensor is constructed and arranged to effect measurement of said mechanical vibration in different directions.

10. A system for operating a sensor, comprising a printed-circuit board disposed in a housing, said sensor installed on said printed-circuit board, means for measuring mechanical vibration at a location of said sensor, and means for deactivating at least one of said sensor and an electronic unit coupled to said sensor for as long as said vibration is at least one of exceeding a predefined intensity and occurring within a predefined frequency band.

11. The system according to claim 10, wherein said means for measuring said mechanical vibration is at least one acceleration sensor.

12. The system according to claim 11, wherein said at least one acceleration sensor is disposed immediately proximate to said sensor.

13. The system according to claim 11, wherein said at least one acceleration sensor is constructed and arranged to measure different vibrational bandwidths.

14. The system according to claim 13, wherein said at least one acceleration sensor has a bandwidth between 300 and 450 Hz.

15. The system according to claim 11, wherein said at least one acceleration sensor is constructed and arranged to effect measurement of said mechanical vibration in different directions.

16. The system according to claim 10, wherein at least one of said housing and said printed-circuit board is constructed to form only a minimal number of narrowly confined resonance ranges during vibrational excitation.

17. The system according to claim 10, further comprising holding members for mounting said printed-circuit board in a vibration-damping manner.

18. The system according to claim 10, wherein said sensor is a yaw rate sensor.

\* \* \* \* \*